US011856497B2

(12) United States Patent
Ossin et al.

(10) Patent No.: US 11,856,497 B2
(45) Date of Patent: Dec. 26, 2023

(54) TRACKING AND THEFT-RECOVERY SYSTEM FOR MOBILE ASSETS

(71) Applicants: Discovery Limited, Sandton (ZA); Cambridge Mobile Telematics, Cambridge, MA (US)

(72) Inventors: Ilan Ossin, Johannesburg (ZA); Hari Balakrishnan, Belmont, MA (US); Lewis David Girod, Arlington, MA (US)

(73) Assignees: Discovery Limited, Sandion (ZA); Cambridge Mobile Telematics, Cambridge, MA (US)

( * ) Notice: Subject to any disclaimer, the term of this patent is extended or adjusted under 35 U.S.C. 154(b) by 0 days.

(21) Appl. No.: 17/109,228

(22) Filed: Dec. 2, 2020

(65) Prior Publication Data
US 2021/0084473 A1 Mar. 18, 2021

Related U.S. Application Data

(60) Continuation-in-part of application No. 16/025,968, filed on Jul. 2, 2018, now Pat. No. 11,240,651, which
(Continued)

(51) Int. Cl.
*H04W 4/80* (2018.01)
*H04W 4/029* (2018.01)
(Continued)

(52) U.S. Cl.
CPC ............ *H04W 4/80* (2018.02); *B60R 25/102* (2013.01); *B60R 25/32* (2013.01); *H04W 4/027* (2013.01);
(Continued)

(58) Field of Classification Search
CPC ....... H04W 4/80; H04W 4/027; H04W 4/029; H04W 4/40; H04W 64/006; B60R 25/102; B60R 25/32; B60R 25/33
See application file for complete search history.

(56) References Cited

U.S. PATENT DOCUMENTS 5,963,131 A 10/1999 D'Anelo
9,213,871 B1 12/2015 Diorio et al.
(Continued)

FOREIGN PATENT DOCUMENTS

EP 0919442 A2 2/1999
EP 0919442 A2 6/1999
(Continued)

OTHER PUBLICATIONS

What is LoRaWAN, Buursen, Aug. 2015; https://waag.org/en/article/what-lorawan (Year: 2015).*
(Continued)

*Primary Examiner* — Jianxun Yang
(74) *Attorney, Agent, or Firm* — Fleit Intellectual Property Law; Paul D. Bianco; Jon Gibbons

(57) ABSTRACT

A tracking device and method of determining a location of a tag connected to an object. The method comprises transmitting a first message from a server over a long range communication protocol to the tag so that the tag emits short and long range distress messages; receiving at a server the long range distress messages including location data using the long range communication protocol; using the location data to determine a geographical area in which the tag is located; transmitting a message from the server to one or more mobile devices in the geographic area to enable the mobile devices to receive the short range distress messages; receiving at the mobile devices the short range distress messages from the tag and using the received short range distress message to locate the tag; and transmitting a second
(Continued)

message from the mobile devices to the server including the location of the tag.

20 Claims, 6 Drawing Sheets

Related U.S. Application Data is a division of application No. 15/355,253, filed on Nov. 18, 2016, now Pat. No. 10,015,654.

(60) Provisional application No. 62/256,861, filed on Nov. 18, 2015.

(51) Int. Cl.
| | |
|---|---|
| B60R 25/32 | (2013.01) |
| H04W 4/02 | (2018.01) |
| H04W 64/00 | (2009.01) |
| H04W 4/40 | (2018.01) |
| B60R 25/102 | (2013.01) |
| B60R 25/33 | (2013.01) |

(52) U.S. Cl.
CPC ............ *H04W 4/029* (2018.02); *H04W 4/40* (2018.02); *H04W 64/006* (2013.01); *B60R 25/33* (2013.01)

(56) References Cited

U.S. PATENT DOCUMENTS

| | | | |
|---|---|---|---|
| 10,015,654 | B2 | 7/2018 | Ossin et al. |
| 10,771,945 | B2 | 9/2020 | Ossin et al. |
| 11,240,651 | B2 | 2/2022 | Ossin |
| 2007/0018820 | A1 | 1/2007 | Chand et al. |
| 2007/0102574 | A1 | 5/2007 | Frumin |
| 2009/0315679 | A1 | 12/2009 | Bauchot et al. |
| 2011/0140884 | A1 | 6/2011 | Santiago et al. |
| 2011/0205040 | A1 | 8/2011 | Van Wiemeersch et al. |
| 2012/0139760 | A1* | 6/2012 | Bevacqua ............ B60R 25/33 340/989 |
| 2013/0101876 | A1 | 4/2013 | Bizic |
| 2013/0217332 | A1 | 8/2013 | Altman et al. |
| 2014/0308915 | A1* | 10/2014 | Reitnour ........... H04M 1/72424 455/404.2 |
| 2014/0309884 | A1* | 10/2014 | Wolf ..................... B60W 10/18 701/41 |
| 2015/0154847 | A1 | 6/2015 | Oliver |
| 2015/0158461 | A1 | 6/2015 | Hess |
| 2016/0057596 | A1* | 2/2016 | Thompson .............. H04W 4/90 455/404.1 |
| 2016/0344509 | A1* | 11/2016 | Hayman ........... H04W 74/0833 |
| 2017/0142543 | A1 | 5/2017 | Ossin et al. |
| 2017/0287315 | A1 | 10/2017 | Kaur |
| 2018/0324569 | A1 | 11/2018 | Ossin et al. |
| 2018/0332456 | A1 | 11/2018 | Ossin et al. |

FOREIGN PATENT DOCUMENTS

| | | |
|---|---|---|
| EP | 1522981 A2 | 4/2005 |
| WO | 2006/057804 A2 | 6/2006 |
| WO | 2010/039741 | 4/2010 |
| WO | 2011/011405 A2 | 1/2011 |
| WO | 2011/013084 A1 | 2/2011 |
| WO | 2011013084 A1 | 2/2011 |
| WO | 2015166314 A1 | 11/2015 |
| WO | 2017/085674 A1 | 5/2017 |

OTHER PUBLICATIONS

Office action for U.S. Appl. No. 16/025,968 dated Jan. 21, 2020 **** fr 056div1.
Office action for U.S. Appl. No. 16/025,974 dated Jan. 22, 2020 **** fr 056con1.
Response filed Apr. 21, 2020 for U.S. Appl. No. 16/025,968 fr 056div1.
Response filed Apr. 21, 2020 for U.S. Appl. No. 16/025,974 fr 056con1.
Notice of allowance dated May 11, 2020 for U.S. Appl. No. 16/025,974 **** fr 056con1.
Issue notice dated Aug. 19, 2020 for U.S. Appl. No. 16/025,974 fr 056con1.
Final Office action for U.S. Appl. No. 16/025,968 dated May 12, 2020 **** fr 056div1.
RCE Response filed Oct. 12, 2020 for U.S. Appl. No. 16/025,968 fr 056div1.
Interview summary for U.S. Appl. No. 16/025,968 dated Sep. 25, 2020 fr 056div1.
International Search Report for PCT/IB16/056950 (WO2017/085674) dated Feb. 24, 2017.
Written Opinion for PCT/IB16/056950 (WO2017/085674) dated Feb. 24, 2017.
U.S. Appl. No. 15/355,253, Office Action dated Jul. 24, 2017.
U.S. Appl. No. 15/355,253, response filed Oct. 9, 2017.
U.S. Appl. No. 15/355,253, Final Office Action dated Nov. 28, 2017.
U.S. Appl. No. 15/355,253, response filed Feb. 26, 2018.
U.S. Appl. No. 15/355,253, Requirement for Restriction dated Jun. 5, 2017.
U.S. Appl. No. 15/355,253, response filed Apr. 12, 2017.
Office action for Australian application serial No. 2016357641, dated Dec. 4, 2020.
Final Office action for U.S. Appl. No. 16/025,968 dated Apr. 14, 2021.
Interview summary for U.S. Appl. No. 16/025,968 dated May 18, 2021.
After Final Response filed Jun. 10, 2021 for U.S. Appl. No. 16/025,968.
AdvisoryAction for U.S. Appl. No. 16/025,968 dated Jun. 29, 2021.
RCE Response filed Aug. 16, 2021 for U.S. Appl. No. 16/025,968.
Notice of allowance for U.S. Appl. No. 16/025,968 dated Apr. 14, 2021.
Issue notice for U.S. Appl. No. 16/025,968 dated Apr. 14, 2021.

\* cited by examiner

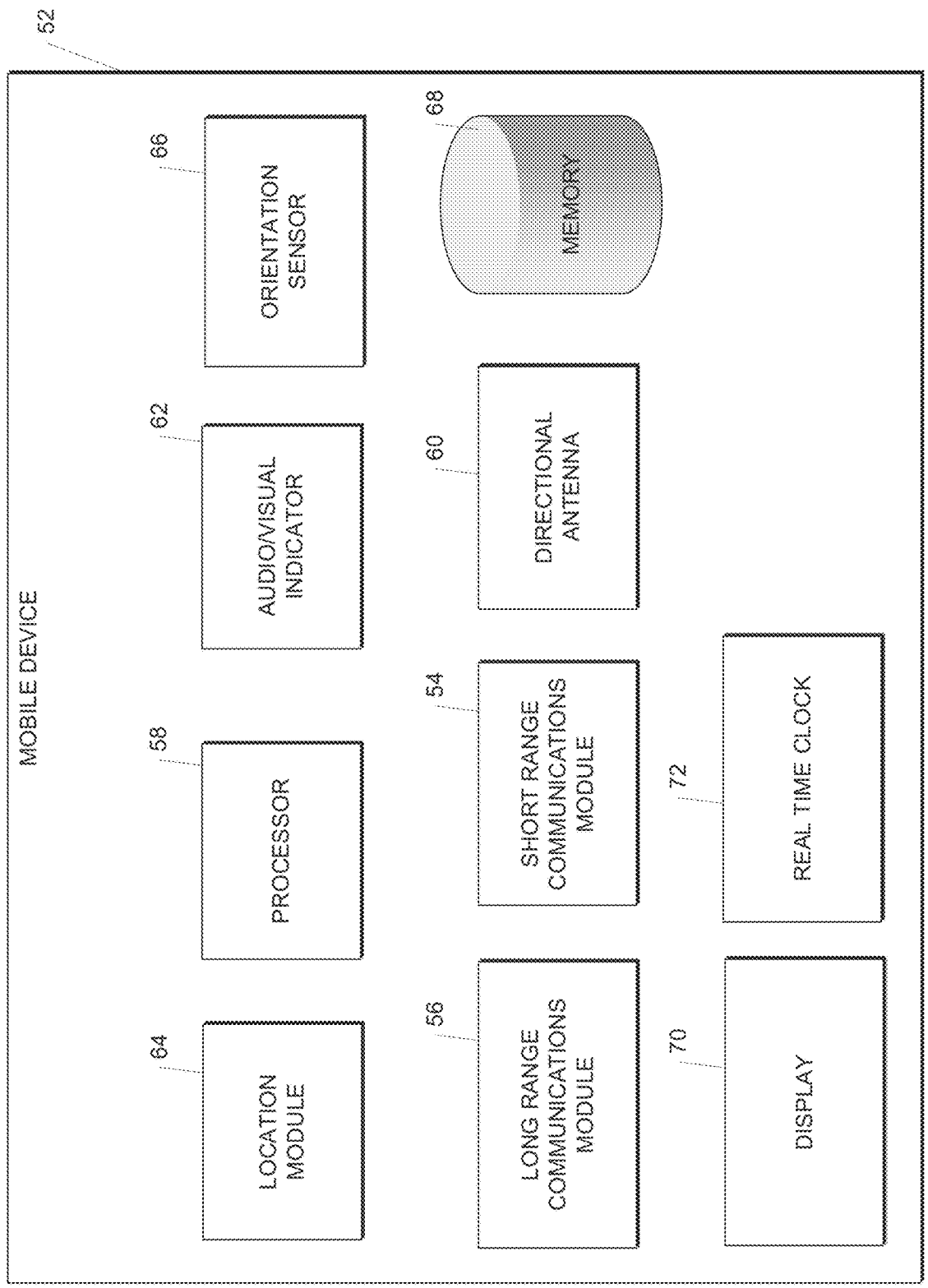

TRACKING AND THEFT-RECOVERY SYSTEM FOR MOBILE ASSETS

FIELD OF THE INVENTION

The present application relates to a tracking system for mobile assets, including an option to recover stolen assets, particularly for motor vehicles.

BACKGROUND OF THE INVENTION

Motor vehicle theft is a significant problem in many parts of the world. Current vehicle tracking devices either make use of a "deep install" black box device that is physically fitted to the vehicle; they also include a wide-area wireless radio frequency (RF) interface such as a cellular radio or some other proprietary radio frequency system for the device to communicate via a communication network with computers that track the location of vehicles. The use of such a network increases the cost of operations of the asset tracking system.

In addition, prior solutions to the theft problem require a human (e.g., the vehicle's owner) to discover that the vehicle has been stolen, to then send a message to an operations center to report theft. Then, in response, the location of the stolen vehicle may be found using the location data periodically sent to a server under the control of the operations center, or sent in response to a query made to the black box in the car. This process may take several hours or even days because of the delay involved in a human discovering that the vehicle may have been stolen.

Moreover, in the field of insurance telematics, an insurer may wish to monitor driving behaviour of a vehicle with the owner's consent, in order to determine how a vehicle is being driven by a driver provide insurance discounts to good drivers and create incentives and programs for safer driving.

This present invention provides an improved asset tracking and theft recovery system that (1) does not mandate a wide-area wireless communication module on the tracking device inside a vehicle, (2) whether or not a wide-area wireless communication module is used on the tracking device, supports the ability to pre-emptively discover within a few minutes of movement that a vehicle is running without the presence of an authorized user of the vehicle (and hence may possibly be in the process of being stolen), and (3) as an option, embeds the ability to monitor the relevant driving behaviour elements required by the insurer without the need to attach the device to the vehicle harness.

SUMMARY OF THE INVENTION

One aspect of the invention relates to a method of determining a location of a tag connected to an object. The method comprises: transmitting a first message from a server over a long range communication protocol to the tag to switch the tag into a distress mode; based on switching into the distress mode the tag emits short range distress messages and long range distress messages; receiving at a server the long range distress messages including location data transmitted from the tag using the long range communication protocol; using the location data to determine a geographical area in which the tag is located; transmitting a message from the server to one or more mobile devices in the geographic area of the tag to enable the one or more mobile devices to receive short range distress messages from the tag; receiving at the one or more mobile devices the short range distress messages from the tag and using the received short range distress message to locate the tag; and transmitting a second message from the one or more mobile devices to the server including the location of the located tag.

In an embodiment, the long range communication protocol is a low power long range communication protocol, such as, for example, a low power wide-area networks (LPWAN). In an another embodiment, the long range communication protocol is a LoRa (Low Energy Long Range) wireless communication module for communication over a LoRa wireless network or a cellular network. In some embodiments, the short range distress messages is encrypted and/or is a Bluetooth communication.

In an embodiment, on receipt of a short range distress message from the tag, the one or more mobile devices produces an audio and/or visual indicator for a user of the mobile device indicating if they are moving towards or away from the located tag. In an exemplary embodiment, the audio and/or visual indicator is a sound that gets more frequent or louder as the mobile device gets closer to the tag.

The tag can further comprise a memory for storing a unique identifier of the tag. The tag can further comprise an accelerometer that measures the acceleration of the tag and thereby of a vehicle in which the tag is installed, and the tag stores acceleration data in a memory. The tag can also provide driving behaviour data.

Another aspect of the invention relates to a tracking device in a vehicle comprising: a short range wireless communication module; a long range wireless communication module; and a controller communicatively coupled to connected to the short range wireless communication module and a long range wireless communication module. The controller is configured to in response to receiving via the long range wireless communication module a first message from a server over a long range communication protocol switch the controller into a distress mode. Based on switching into the distress mode, the short range wireless communication module emits short range distress messages via the short range wireless communication module and long range distress messages via the long range wireless communication module. Short range distress messages are periodically transmitted via the short range wireless communication module for reception by other mobile communications devices within range and located outside the vehicle that are capable of receiving the distress messages and are within range and located outside the vehicle.

The short range wireless communication module can be a Bluetooth communication module. The long range wireless communication module can be a LoRa (Low Energy Long Range) wireless communication module for communication over a LoRa wireless network or a cellular network. The tracking device can further comprise a memory for storing a unique identifier of the tracking device. An accelerometer can be communicatively coupled to the controller such that the accelerometer measures the acceleration of the tracking device and thereby of a vehicle and stores acceleration data in a memory. The controller controls the short range wireless communication module to transmit a sequence of time stamped acceleration data to a mobile communications device.

BRIEF DESCRIPTION OF THE DRAWINGS

A more complete understanding of the present invention, and the attendant advantages and features thereof, will be more readily understood by reference to the following description when considered in conjunction with the accompanying drawings wherein:

FIG. 6 is a schematic representation of another example of a mobile communications device used in the tracking system of FIG. 1;

DESCRIPTION OF THE EMBODIMENTS

Figure 1:
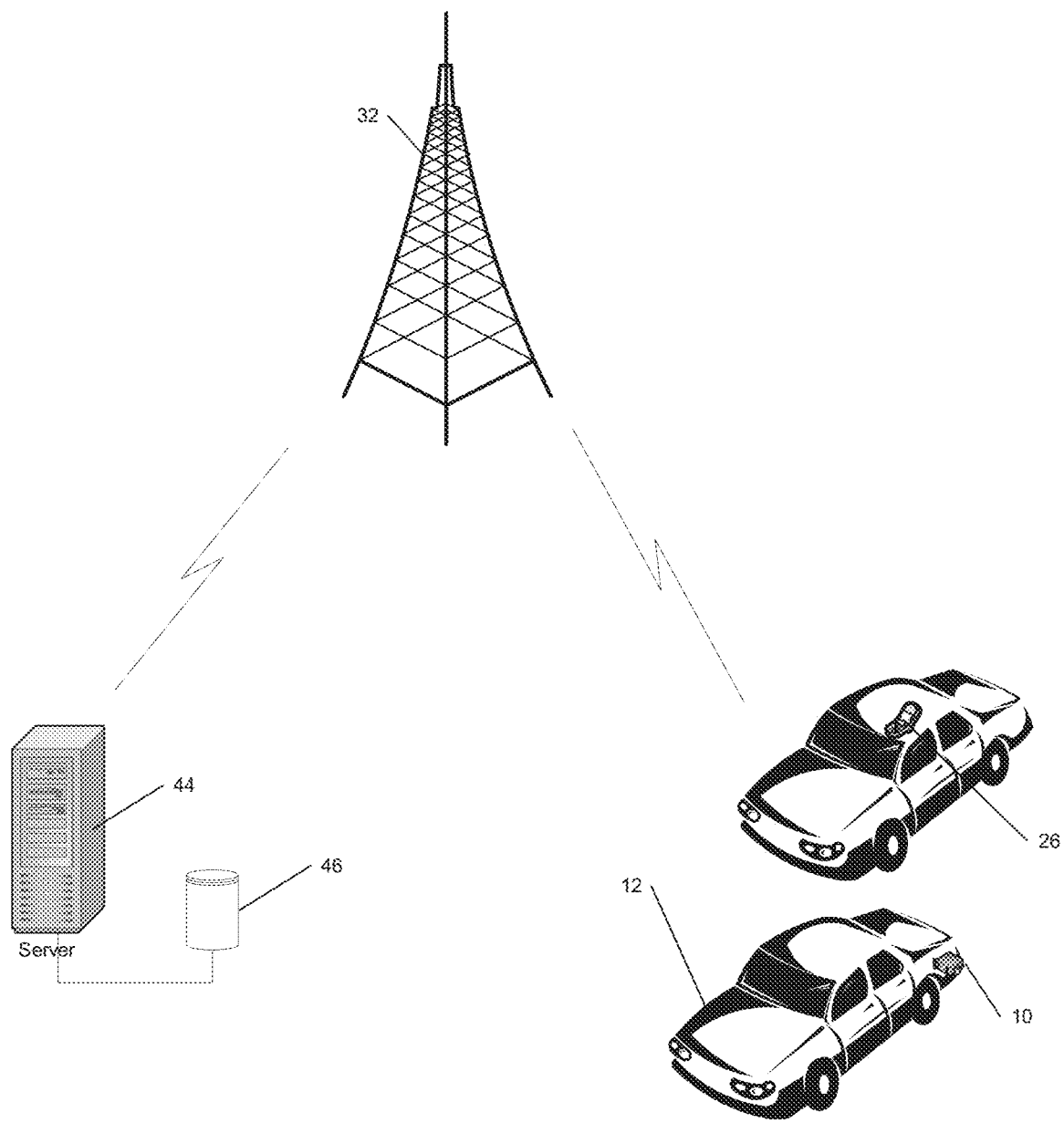
FIG. 1 shows an example tracking system.

As required, embodiments are disclosed herein; however, it is to be understood that the disclosed embodiments are merely examples and that the methods described below can be embodied in various forms. Therefore, specific structural and functional details disclosed herein are not to be interpreted as limiting, but merely as a representative basis for teaching one skilled in the art to variously employ the present subject matter in virtually any appropriately detailed structure and function. Further, the terms and phrases used herein are not intended to be limiting, but rather, to provide an understandable description of the concepts.

It can be advantageous to set forth definitions of certain words and phrases used throughout this disclosure. The terms "a" or "an", as used herein, are employed to describe elements and components described herein. This is done merely for convenience and to give a general sense of the scope of the disclosure. This description should be read to include one or at least one and the singular also includes the plural unless it is obvious that it is meant otherwise. The term plurality, as used herein, is defined as two or more than two. The term another, as used herein, is defined as at least a second or more.

The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. As used herein, the terms "substantial" and "substantially" means, when comparing various parts to one another, that the parts being compared are equal to or are so close enough in dimension that one skill in the art would consider the same. Substantial and substantially, as used herein, are not limited to a single dimension and specifically include a range of values for those parts being compared. The range of values, both above and below (e.g., "+/−" or greater/lesser or larger/smaller), includes a variance that one skilled in the art would know to be a reasonable tolerance for the parts mentioned.

Note that not all of the activities described above in the general description or the examples are required, that a portion of a specific activity may not be required, and that one or more further activities can be performed in addition to those described. Still further, the order in which activities are listed are not necessarily the order in which they are performed.

In general, the disclosure relates to a tracking device and a tracking system within which the device operates.

Referring to the accompanying drawings, the tracking device 10 is shown for use in tracking a motor vehicle 12. However, it will be appreciated that the tracking device 10 could be used to track other suitable assets.

In the illustrated example embodiment, the tracking device 10 is in the form of a tag that typically includes a physical connector (not shown) by means of which the device can be physically attached to a motor vehicle which is to be tracked.

Figure 2:
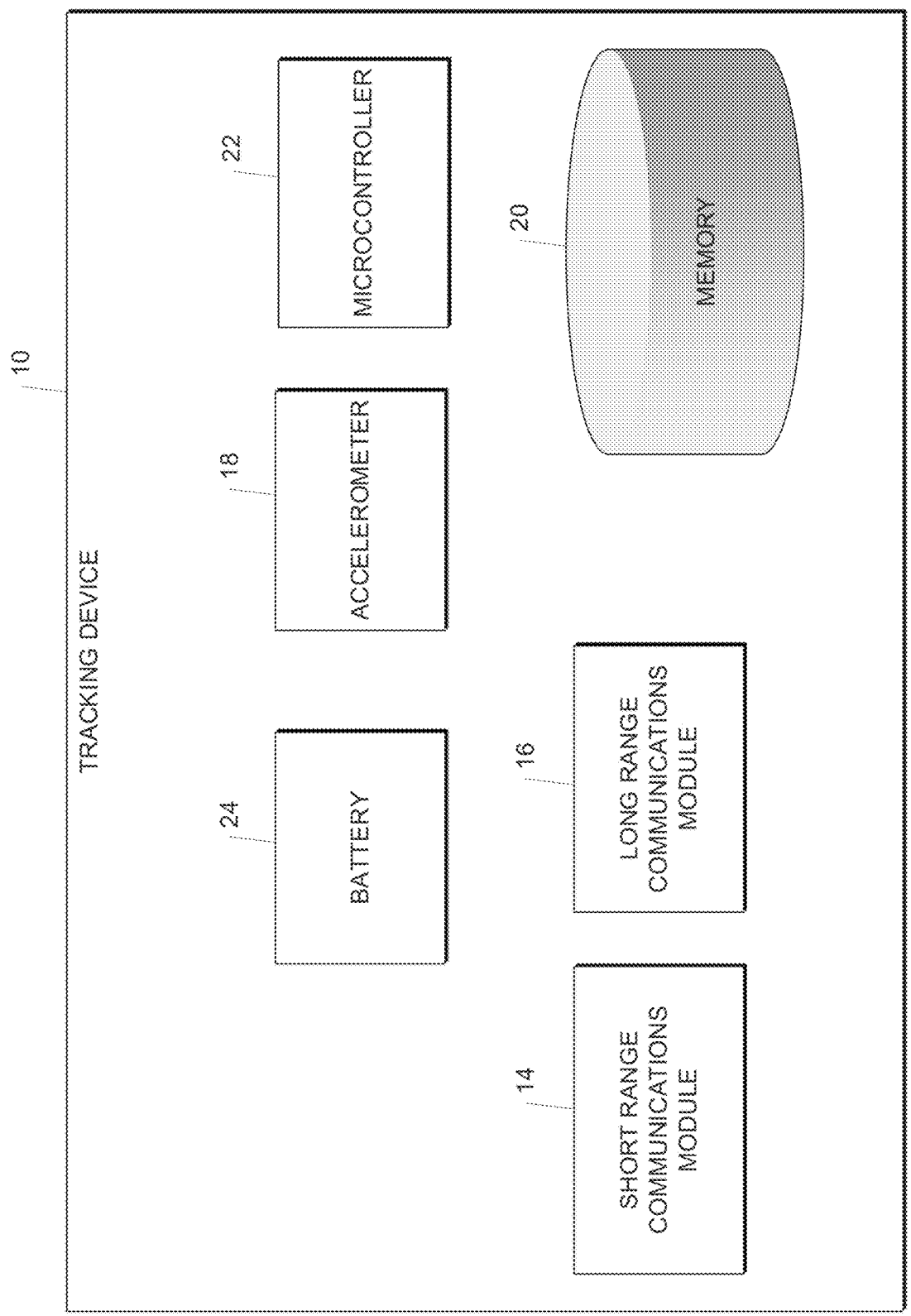
FIG. 2 is a schematic representation of a tracking device used in the tracking system of FIG. 1.

Referring to FIG. 2, the tracking device 10 includes a short range wireless communication module 14 typically in the form of a Bluetooth Low Energy (BLE) communication module.

The tracking device 10 also includes an accelerometer 18, which measures acceleration of the tracking device 10, and thereby measures the acceleration of any object to which the tracking device 10 is connected in use. The function of this accelerometer will be described in more detail below.

The tag may have additional sensors as well, including a gyroscope and compass.

In the preferred embodiment, the tracking device 10 is battery-operated and so includes a battery 24.

The tracking device 10 also includes a memory 20 in which at least a unique identifier of the tracking device 10 is stored.

The tracking device 10 is used to track a stolen object using a plurality of mobile communication devices typically in the form of mobile telephones 26, which are encountered in the vicinity of the stolen object By way of overview, in the first example the tracking device 10 uses the short range communication module 14 to transmit a distress signal including an identity of the tracking device 10 obtained from memory 20. The distress messages are then received by mobile communication devices 26, which are used to determine the locations traversed by the tracking device 10 (and therefore of the stolen object), as will be explained in more detail below.

Referring back to FIG. 1, in one example embodiment the object to which the tracking device 10 is connected is a motor vehicle 12. If the motor vehicle is determined to be stolen (this will be explained in more detail below), mobile communications devices in the form of mobile telephones 26 in passing motor vehicles or with people on roadsides or in nearby buildings are typically used to receive BLE distress messages transmitted from the tracking device 10.

The BLE distress message may be received directly by the mobile communications device 26 or may be transmitted from one tracking device 10 to another tracking device 10 (possibly multiple times) before terminating in a mobile communications device 26.

In this example a threshold of allowable hops are set before the signal reaches a mobile communications device 26. Alternatively, or in addition, a time bound may be set, i.e., any number of hops is allowable as long as the current time is not more than T minutes from the origination time of the message. If more than T minutes have elapsed, then the message will be discarded and won't be forwarded further. This is because the information about the stolen object's current location, inferred from a location/positioning module 36 (such as GPS) on the mobile communications device, will not be pertinent if the time difference is too large.

Figure 3:
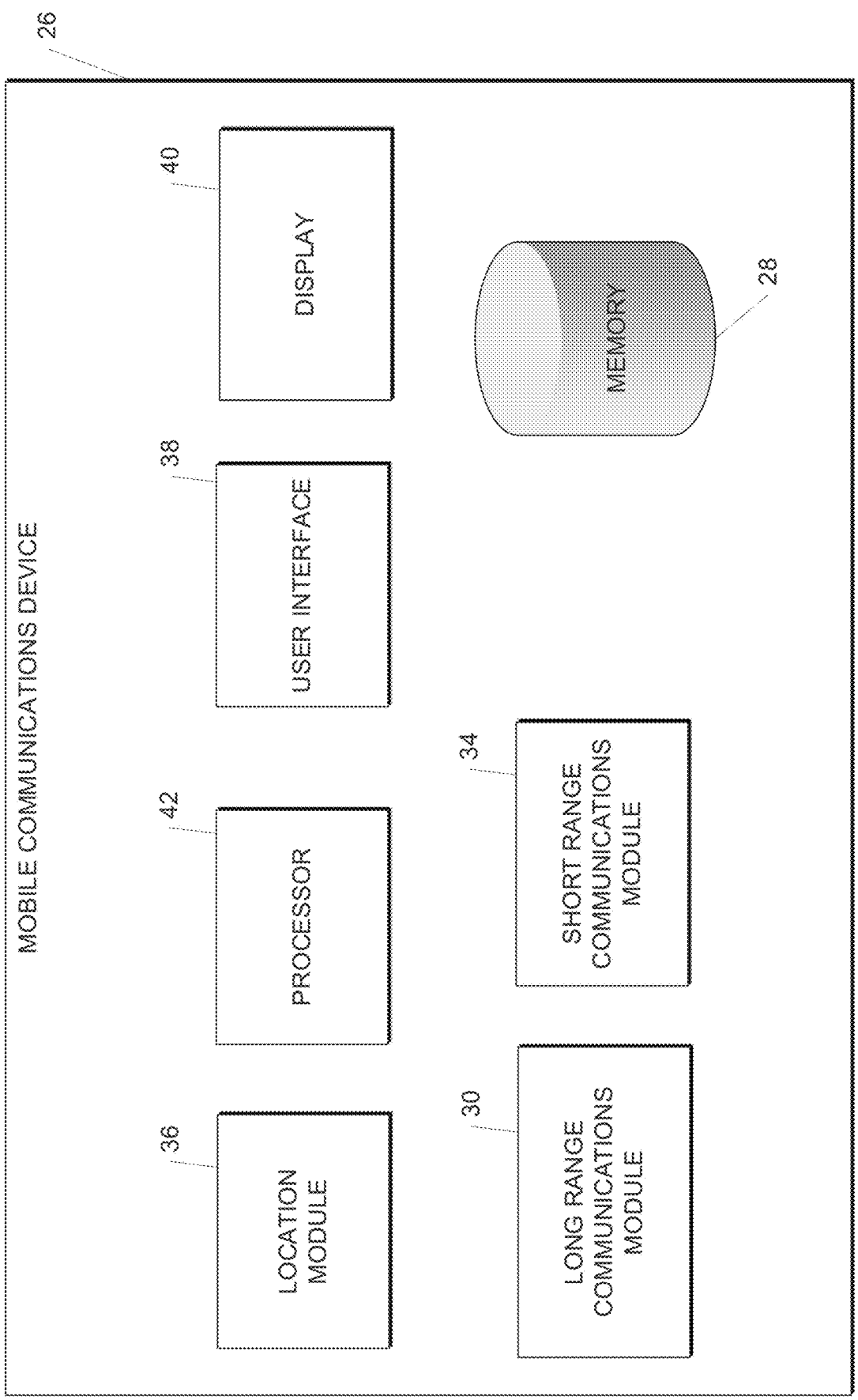
FIG. 3 is a schematic representation of a mobile communications device used in the tracking system of FIG. 1.

In any event, FIG. 3 illustrates the mobile communications device 26 in more detail. It will be appreciated that this device will typically be a so-called smartphone. It may also be a tablet device or a dedicated device purpose-built and installed in commonly-driven areas (e.g., fuel refuelling stations).

The mobile communications device 26 includes a memory 28 for storing therein a unique identifier of the mobile communications device 24.

A long range communications module 30 is used by the mobile communications device 26 for communication over a cellular communications network 32 (shown in FIG. 1). It could also use a Wi-Fi network or any other data network available on the mobile communications device 26.

A short range communications module 34 is used by the mobile communications device 26 for receiving short range signals transmitted from the tracking device 10.

It will be appreciated that in the illustrated embodiment, the short range communications module 34 is a Bluetooth Low Energy (BLE) communications module.

A location determination module 36 is used to determine the location of the mobile communication device 26. This module 36 is typically a Location Provider (e.g., a global positioning system such as GPS) module that is able to determine the location of the mobile communications device 26 at any given time. It may also be a so-called network location provider that obtains location information using cellular or Wi-Fi signals, or using a combination of GPS and network location.

The mobile communications device 26 typically also includes a user interface 38 for receiving inputs from the user and a display 40 for displaying information to the user.

A processor 42 controls the operation of the mobile communications device 26 so that on receipt of a short range BLE signal containing the unique identifier of a tracking device 10, a location at that time is obtained from the location module 36.

Because the mobile communications device 26 must have been within close proximity to the tracking device 10 to receive the signal transmitted from the tracking device 10, the location of the mobile communications device 26 is in fact substantially the same location as the tracking device 10.

In this way, the location of the tracking device 10 can effectively be determined when a mobile communications device 26 is nearby.

Once a location is determined, a message is transmitted by the mobile communications device 26 via the long range communication module 30 over the cellular network 32 to a server 44 with an associated memory 46.

The message will include at least the received unique identifier of the tracking device 10, a time of receipt of the short range wireless signal from the tracking device 10, and the determined location of the tracking device 10 when the short range signal was received.

Figure 4:
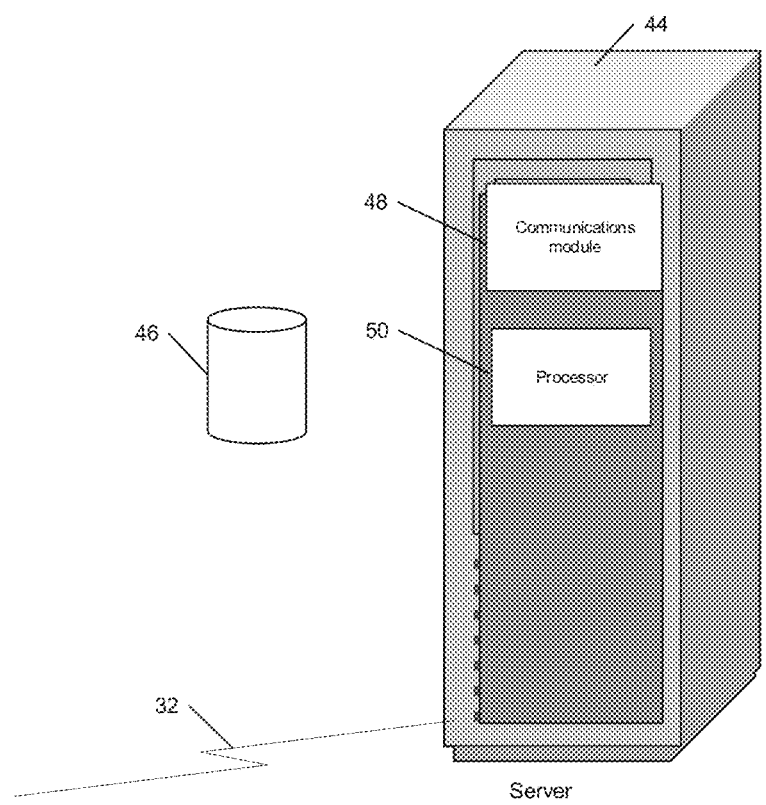
FIG. 4 is a schematic representation of a server used in the tracking system of FIG. 1.

Referring to FIG. 4, the server 44 includes a number of modules.

In one example embodiment, the modules described may be implemented by a machine-readable medium embodying instructions which, when executed by a machine, cause the machine to perform any of the methods described above.

In another example embodiment the modules may be implemented using firmware programmed specifically to execute the method described herein.

It will be appreciated that embodiments of the present invention are not limited to such an architecture, and could equally well find application in a distributed system, or a peer-to-peer, architecture system. Thus the modules illustrated could be located on one or more servers operated by one or more institutions.

In any event, a communications module 48 allows the server 44 to communicate over a communications network 32 (such as the Internet) to the mobile communications device 26.

A processor of the server 50 includes an analysing module that continuously evaluates received messages and in this way is able to track the movement of tracking device 10 via the location information data received.

Thus it will be appreciated that the tracking system of the present invention effectively provides a "crowd-sourced tracking model" that relies on the capability of mobile communications devices in the general vicinity of a tracked object to connect to a tracking device via BLE and to determine the position of itself via GPS.

There are various ways in which the tracking device 10 can be placed in a distressed mode where it is periodically transmitting distress signals.

In a first embodiment, the tracking device 10 includes a long range communication module 16 which is used by the server 44 to switch the device 10 into distress mode.

The long range wireless communication module 16 is typically in the form of a cellular or LoRa wireless communication module or equivalent.

The long-range wireless communication module 16 receives an "activate" message transmitted from the server 44 and in response thereto the processor 22 controls the tracking device 10 to put the device in a distressed mode whereby the short range wireless communication module 14 transmits messages or transmits messages more frequently indicating that the asset must be tracked and found.

In this embodiment, in addition to using BLE transmissions received by a nearby mobile communications device 26 to determine the location of the tracking device 10, the location of the tracking device 10 can be approximately obtained and tracked using location information inferred from long range wireless signals of the cellular network, LoRa, or equivalent. In this scenario the short range and long range communication functionality of the tracking device 10 are used to complement one another.

In this example embodiment, the security protocol is further enhanced in that the identity of a "master" mobile communication device (e.g., the smartphone belonging to the owner or other authorized users of the vehicle, which would run an application capable of processing signals sent by the tracking device 10) will be stored in the memory 20 of the tracking device 10. Should the vehicle then be moving and the "master" mobile communication device not be present in the vehicle, the tracking device 10 using the LoRa module 16 would be able to initiate a distress signal to the server 44 and turn the tracking device into "distress mode."

In one example, the controller 22 checks, via the short range wireless communication module 14, if a master mobile communications device is located within range of the tracking device.

If a master mobile communications device is located within range of the tracking device (e.g., because it connects to the tracking device over BLE), then the controller 22 will not activate the short range communication module 14 to periodically transmit short range wireless messages.

If a master mobile communications device is not located within range of the tracking device then the controller 22 will transmit a message via the long range communication module 16 requesting from a server a status of the object to which the device is attached and then receiving a status message back from the server.

In addition, the following is an example of a policy applied to the system that would enable tracking of the module in this embodiment:

1) The tracking device 10 would communicate with the in-vehicle mobile smartphone each time the vehicle starts to move based on a movement algorithm embedded in the device 10.

2) After T minutes into the trip the tracking device 10 using the long range communication network 16 would initiate a connection to check in with the server 44 to determine if that vehicle has been reported stolen. Should this be the case, the tracking device 10 is put into the distress mode whereby it will send more frequently the Bluetooth Low Energy ID packets and may communicate more frequently via the long-range communications infrastructure in order to provide information to triangulate the tracking device's location.

3) All receiving mobile communication devices 26 are also instructed configured to "read" these distress signals and report the location to the server 44.

In another embodiment the device 10 operates with only the short-range communications module 14 operating in conjunction with a master mobile communications device as follows. It will be appreciated that this embodiment will have lower costs of implementation and operations compared to using the long-range communications capability.

When the vehicle starts moving the tracking device 10 will attempt to authenticate with a mobile device/smartphone 26 in the vehicle.

The movement of the vehicle is detected as described above using a movement algorithm embedded in the device 10 based on the magnitude of detected acceleration exceeding a threshold for a certain period of time and this identifies that the vehicle is being driven.

Once movement is detected, the device 10 will communicate with the mobile device 26 via the short range mobile communications modules 14 and 32 and the tracking device 10 will transmit its unique identifier to the mobile communications device 26.

It will be appreciated that in order for this to occur a software application is executing on the processor 42 of the mobile communications device 26.

By way of this executable application, the mobile communications device 26 may authenticate the tracking device 10 by comparing the received identification with an identification stored in memory 20. If these match, then an "authenticated" message is transmitted back to the tracking device 10.

Alternatively, or in addition, the mobile communications device 26 will check with the server 44 if it is allowed to authenticate the device 10. In one example, this is done by the mobile device 26 transmitting the serial number of the device 10 via the mobile communication device's long-range communications module 30, together with an identification of the mobile communications device 26 to the server 44.

Upon receipt of the data via the communications module 48, the server 44 will access the memory 46 to ascertain if the tracking device 10 is associated with the mobile communications device 26 from which the data has been received.

If the device 10 is associated with the mobile device 26, a message is transmitted back to the mobile device 26 confirming this fact.

Upon receipt of this data message, the mobile device 26 communicates with the device 10 confirming this authentication.

If the device 10 does not receive an authentication message, it will enter distress mode.

The operation of the system in distress mode is time-based: if a message is not received within a specific time, then the tracking device 10 will enter distress mode.

In distress mode, the device 10 will transmit distress messages periodically as described above.

A more detailed explanation of this embodiment is as follows.

The accelerometer 18 on the tracking device 10 detects motion of the object based on the magnitude of detected acceleration exceeding a threshold for a certain period of time and this identifies that the vehicle is being driven.

Once movement is detected, the device 10 will communicate with the mobile communications device 26 via the short range mobile communications modules 14 and 32. In the example of using the Bluetooth communication protocol, a Bluetooth connection is established between the device 10 and the mobile device 26. Communication between the device 10 and the mobile communications device 26 will now occur via this established Bluetooth connection.

After T minutes without receiving an authenticated "cancel alarm" command (described below), the tracking device 10 will begin transmitting a "distress message" that includes the unique identifier of the tracking device 10.

This distress message is transmitted in one of two ways:
 a. In one embodiment, it is transmitted using the highest power setting available on the short-range wireless communication module 14.
 b. In another embodiment, it is transmitted using the long-range wireless communication module 16 if such a module is present on the tracking device
 c. It may also be sent on both if both options are available.

The transmission of distress messages is cancelled if a mobile communications device 26 connects to the tracking device 10 and transmits an authenticated and valid "cancel alarm" command to the tracking device 10.

If such a message is received by tracking device 10 via the BLE communications module, then the tracking device 10 will cease transmitting distress messages for as long as the mobile communications device 26 remains connected to the tracking device 10 via the short range communications protocol as described above.

As explained below, only mobile communication devices belonging to authorized owners or operators of the vehicle are able to send a valid and authenticated "cancel alarm" message.

The following method is used to produce authenticated and valid "cancel alarm" messages for the mobile communications device 26 to send to the tracking device 10 over a connection to the short-range wireless module (BLE) 14. As the mobile communications device 26 is assumed to be untrusted, the method relies on a shared security secret between the tracking device 10 and the server 44.

This is described as follows. Suppose a mobile communications device 26 belonging to a user authorized to be present in the vehicle while it is driving.

The mobile communications device 26 connects to the tracking device 10 via the short-range wireless module 14 (BLE).

When the tracking device 10 accepts the connection it generates a one-time connection nonce (i.e., a single-use identifier) that is valid for the duration of the connection and sends it to the connected mobile communications device 26.

The mobile communications device 26 sends a request to the server 44 via the long range communications modules 30 and 48 containing the unique identifier of the tracking device 10 and the connection nonce, as well as the user's credentials that are available to the mobile communications device (in the mobile application being used).

The server 44 verifies the user's credentials and looks up the mobile communications device 26 and tracking device 10 in its database. If the mobile communications device 26 is authorized to cancel an alert on the specified tracking device 10, then it constructs a valid "cancel alarm". This message is signed with a signature that incorporates a hash of the following information:
 a. the one-time connection nonce
 b. the unique identifier of the tracking device
 c. the text of the message itself
 d. the signature is signed with a symmetric secret key shared by the server 44 and the tracking device 10, that is unique to the tracking device 10.

The signed message is returned to the mobile communications device 26, and the mobile device transmits the message to the tracking device 10 to cancel the alarm.

The alarm remains suppressed only as long as the authorized mobile communications device remains connected.

On a new connection, a new nonce is chosen, invalidating any previously transmitted "cancel alarm" messages Note that the "cancel alarm" method is orthogonal to the method used to send distress messages. The latter may be sent via a short-range wireless module 14 or long-range module 16. In both cases, the "cancel alarm" method is useful to transmit distress messages proactively and only when the vehicle is not being used by an authorized user.

Thus it will be appreciated that in all cases, the asset (motor vehicle) 12 will be in distress mode and moving (being driven) with the BLE module 14 periodically transmitting messages. Each message will include at least the identification of the tracking device 10 obtained from the memory 20.

This tracking device 10 now becomes discoverable by any suitable device which is close enough to the tracking device 10 to receive the message transmitted from the tracking device 10 via its short-range communication module (e.g., BLE).

Any smartphones, tablets, or other devices running an application that embeds in it the ability to process these distress messages will be listening for this specific distress mode as described above, and will send their locations when they pick up a tag in its vicinity in this distressed mode back to the server 44 via the mobile communications network. This capability enables "crowd searching", i.e., the ability to detect and recover theft using devices carried and used by people in their daily lives. Of course, some of the mobile communication devices could also be dedicated infrastructure devices located in locations that are commonly driven.

Should a tag be in distressed mode for a number of days it can turn itself off to preserve the battery life on the device 10. It may also be done if the user is not complying, i.e., does not drive with their phone or keeps the short-range radio (e.g., Bluetooth) off on their mobile communications device 26.

Additionally, command messages will be able to be passed through the crowd to the device 10 as well, i.e., to turn tags in and out of distress mode.

Figure 5:
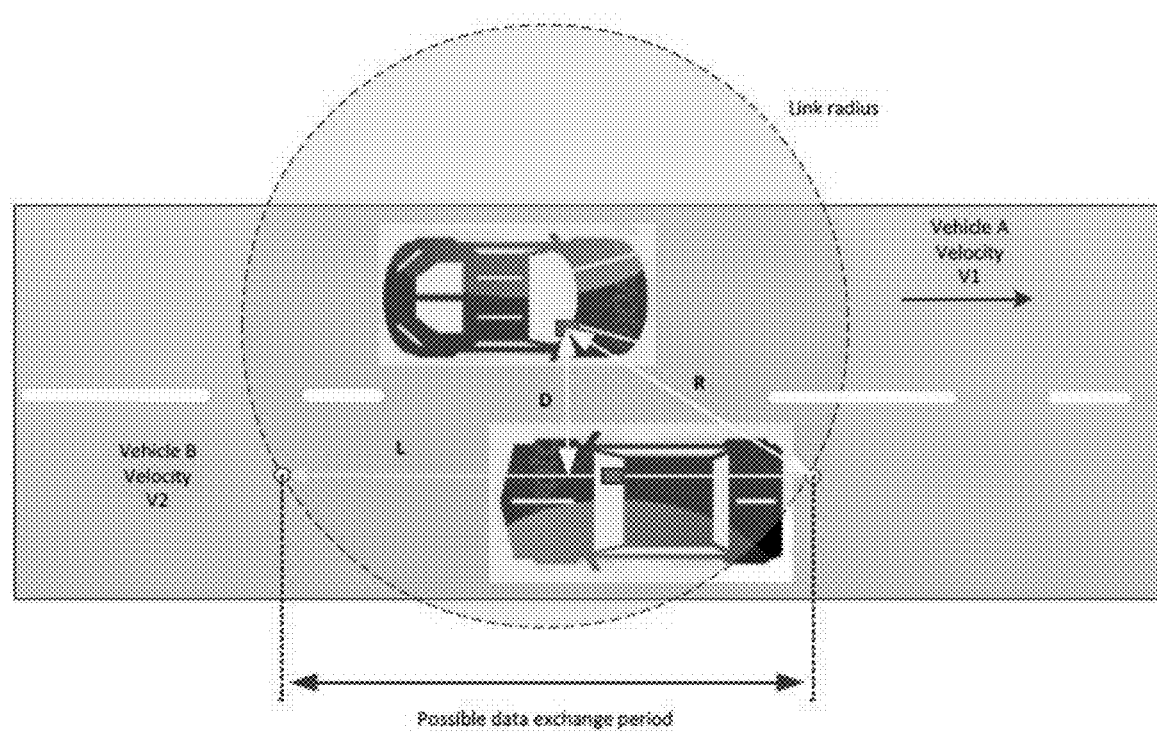
FIG. 5 shows two vehicles passing one another on a standard residential road as per a road test that was conducted to evaluate the present invention.

Referring to FIG. 5, a road test was conducted to evaluate the present invention with two vehicles on a standard residential road. Several scenarios may be considered for this model but the one tested was of two vehicles passing each other in different directions on a road.

A BLE-USB device from Texas Instruments™ was used as the recording device. This device is based on the CC2540 from Texas Instruments™. Data recording was done with SmartRF Packet Sniffer from Texas Instruments™ with a filter set on advertisement type and address.

The BLE modules were first placed in both vehicles front window area where good line-of-sight could be achieved. This was chosen to verify the ranges claimed by the hardware manufacturer. Both vehicles travelled at a speed of 60 km/h.

In the second test, one module was placed on the central console between the front seats where a phone might normally be placed and the second module was placed on top of the sun visor. This presented slight interference by the vehicle's body but also worked.

In a third test, module one was again on the central console and the second was placed in the glove box of the second vehicle. This would represent a more realistic scenario for the location of the tracking device 10 in the vehicle.

The last results correspond to a 50 m link radius when placed in the glove box. The data shows 49 BLE advertisement packets received in the 3 second time span. Most of the packets were received at the lowest interval, meaning there were no dropped packets.

Thus the tests indicate sufficient range with BLE radios.

In addition, two devices were evaluated using different antennas. One module used a PCB etched antenna while the other module used a BLE module with a chip antenna on-board.

The test revealed a better performance with the PCB antenna compared to the chip antenna.

A power consumption calculation for the tracking device 10 was done based on the following model:
 1. The tracking device 10 will be in sleep mode by default.
 2. The accelerometer 18 will be active.
 3. The accelerometer 18 will wake up the processor 22 when movement is detected and the movement pattern must be considered by the processor.
 4. The processor 22 will try to locate one or more mobile communication devices 26 via BLE from an internal list of previously registered "master" mobile devices.
  a. If successful the tracking device 10 will not enter into the distress mode.
  b. If unsuccessful the long range communication module 16 will send a LoRa status request to the server 44.
 5. Processor 22 will then evaluate LoRa Rx for a recovery activation status from the server.
  a. If successful the processor 22 will transmit distress messages on the BLE radio interface 14.
  b. If unsuccessful, the processor 22 will continue to send LoRa status requests on the long range communication network, as well as trying to locate a known master mobile smartphone.
   i. If a known master mobile communication device is found, the system reverts to sleep state.
   ii. If a known master mobile communication device is not found, the processor 22 will continue to send LoRa status request.

6. On average, assume that the vehicle will be driven 4 times per day (i.e., 4 BLE phone verifications).
8. When stolen the BLE advertisement interval will be 20 ms+(0 to 10) ms.
9. The LoRa status request will be sent once every hour. When stolen the LoRa request interval will be set by the server.

The parameters of the system should be chosen so that the energy consumption of the device is very low and the battery would not need to be replaced for 5 years or more. This is feasible with current technology.

If BLE alone is used for tracking the efficiency would be proportional to the advertisement rate and would be even better.

Further testing carried out using the applicant's existing mobile telephone software application executing on driver's mobile telephones and some test devices 10 transmitting via Bluetooth were carried out.

The test was done using a crowd of about 80 000 mobile telephone users in an urban area (in Johannesburg, South Africa) and three test devices deployed in vehicles in constant distress mode.

The tags were detected on average between around 800 and 3000 times per day, which provides strong evidence for the effectiveness of the proposed invention in practice.

In addition to the above, the tracking device 10 in one example embodiment also captures driving data and transmits this back to the server 44.

An example of a "tag" device providing this functionality is described in the applicant's published PCT patent application number PCT/IB2014/065736, the contents of which are incorporated herein by reference.

In brief, the accelerometer 18 measures the acceleration of the tracking device 10 and thereby of the vehicle 12 when the vehicle is moving and reports the data to the microcontroller 22.

The tracking device 10 records acceleration and other sensor data. It streams that data to a mobile device 26 over the short-range wireless communication link, which will in turn process that data and transmits at least a portion of the received and processed data via communications network 32 to the server 44 as described in PCT patent application number PCT/IB2014/065736.

With the telematics functionality incorporated into the tracking device 10, it will be appreciated that a tag is provided which can provide both driver monitoring functionality as well as tracking functionality. It is, of course, also possible two or more such devices (tags and tracking devices) to concurrently be operational in a vehicle. It may even be desirable to have separate devices for stolen vehicle tracking and for driver quality measurement.

In another embodiment the short-range communications module 14 and long-range communications module 16 of the tracking device 10 are used in the following manner.

A message from the server 44 is transmitted over a long range communication protocol to the tag 10 to update the tag into a distress mode.

When the tag 10 is in distress mode it emits short range distress messages via the short-range communications module 14 and long range distress messages via the long-range communications module 16.

The long range communication protocol used by the long-range communications module 16 is a low power long range communication protocol and in one example is a low power wide-area networks (LPWAN).

LPWAN technology is used for connecting devices such as the tags 10 that need to send small amounts of data over a long range, while maintaining long battery life.

LPWAN technologies generally operate with about 140-160 decibels (dB) of total path, which can add up to many kilometres/miles of range.

This is primarily achieved by high receiver sensitivities. Receiver sensitivities of more than −130 dBm are common in LPWAN technologies, compared with the −90 to −110 dBm seen in many traditional wireless technologies.

Technologies with −130 dBm can detect signals 10,000 times weaker than technologies with −90 dBm which is important for LPWAN.

In a prototype of the present invention the LPWAN technology Sigfox™ was used.

Sigfox™ transmits data using binary phase-shift keying (BPSK). Its modulation rate (300 bps) is extremely slow but due to this slow modulation rate, it's able to get great range with fewer base stations.

The server 44 will receive a long range distress message transmitted from the tag using the long range communication protocol and will determine a geographical area in which the tag is located from this message. This is accomplished using the LPWAN proprietary triangulation algorithms.

It will be appreciated that this geographical area is a general geographical typically the size of approximately 1-20 km$^2$.

On receipt of a long range distress message, the server 44 will transmit a message to one or more mobile devices 52 (shown in FIG. 6) in the determined geographic area of the tag 10 to update the one or more mobile devices 52 to receive short range distress messages from the tag. These one or more mobile devices 52 are thus placed into an active listening mode to be used to search for the tag 10 transmitting the distress messages.

The mobile device 52 is a portable battery powered unit that can be worn on the user's belt for example. It allows the operator to determine the direction to the tag.

The one or more mobile devices 52 include a short range communications module 54 and a long range communications module 56.

The short range communications module 54 is used to receive a short range distress message from the tag transmitting the distress messages.

In the prototype embodiment the short range communication module 54 communicates via Bluetooth and the module 54 includes a Bluetooth Front End Amplifier, a Bluetooth Receiver and Bluetooth Antenna Connector.

The Bluetooth Front End Amplifier is typically a SiGE (silicon-germanium) or GaAs (gallium-arsenide) front-end low-noise amplifier with <=1.0 dB noise figure and >=14 dB gain. The amplifier includes a user selectable amplifier bypass for long-range high-gain mode and close-range low-gain mode.

The Bluetooth Receiver is for example a receiver with best-in-class sensitivity such as a TI CC2640R2F receiver.

The Bluetooth Antenna Connector is a highly durable N-type RF connector that allows attachment of external omni or directional antenna.

The short range distress messages are also encrypted.

In the prototype embodiment the long range communication module 56 enables cellular data connection and includes a 2G, Quad-band 850/900/1800/1900 MHz, GSM/GPRS chip with an integrated antenna.

A processor 58 controls the operation of the mobile device 52 to use the received short range distress message to locate the tag transmitting the distress messages. This will be described in more detail below.

The mobile device 52 includes a directional antenna 60 which in the prototype was a Yagi antenna.

The mobile device 52 includes an Orientation Sensor 66 which includes a locking 5-pin mini-XLR connector socket for connection to the directional antenna 60. The function of this will be described in more detail below.

The mobile device 52 also includes an audio and/or visual indicator 62 and the processor 58 controls the audio and/or visual indicator 62 to produce an audio and/or visual indicator for a user of the mobile device 52 indicating if they are moving towards or away from the located tag. This allows the user to localize the vehicle as they walk or drive.

This is done using the signal strength of the received short range distress message from the tag.

The audio and/or visual indicator in one example is a sound that gets more frequent or louder as the mobile device 52 gets closer to the tag and less frequent or softer as the mobile device 52 moves away from the tag.

In the prototype the audio and/or visual indicator includes a built-in speaker where an emitted audio frequency changes with the received Bluetooth signal strength.

The speaker has a mechanical, direct-mapped volume knob and a test button allows the user to generate a tone to test the speaker and speaker volume.

The mobile device 52 includes a location module 64 to determine the location of the mobile device 52. The location module 64 is typically a GPS receiver with an integrated antenna.

A message is also transmitted from the mobile devices 52 to the server 44 including the location of the located tag.

The mobile device 52 includes a battery (not shown) to power the device such as an internal lithium ion or lithium polymer battery which typically has a 3-hour battery life during normal usage and a power switch (not shown) allows the device 52 to be switched on and off.

The battery is charged through a power input connector (not shown) which is a Micro-B USB connector that allows battery charging from standard 5V USB cable supply (e.g. cell phone car charger, wall charger).

The mobile device 52 can also be operated while plugged into a battery charger.

A display 70 takes the form of an LCD display and provides a user Interface which in the prototype is a sunlight readable display with four-line character based display.

A Real-Time Clock 72 contains a real-time clock/calendar which runs even when power switch is off. This is required in order to timestamp sightings before establishing a cellular connection after power-up.

The device 52 is housed in a ruggedized housing suitable for daily field use with a belt clip or strap loop to leave one hand free for the operator.

The device 52 also includes a memory 68 with non-volatile storage ability.

All references cited herein are expressly incorporated by reference in their entirety. It will be appreciated by persons skilled in the art that the present disclosure is not limited to what has been particularly shown and described herein above. In addition, unless mention was made above to the contrary, it should be noted that all of the accompanying drawings are not to scale. There are many different features to the present disclosure and it is contemplated that these features may be used together or separately. Thus, the disclosure should not be limited to any particular combination of features or to a particular application of the disclosure. Further, it should be understood that variations and modifications within the spirit and scope of the disclosure might occur to those skilled in the art to which the disclosure pertains. Accordingly, all expedient modifications readily attainable by one versed in the art from the disclosure set forth herein that are within the scope and spirit of the present disclosure are to be included as further embodiments of the present disclosure.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, sacrosanct or an essential feature of any or all the claims.

After reading the disclosure, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any sub-combination. Further, references to values stated in ranges include each and every value within that range.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A tracking device in a vehicle comprising:
   a short range wireless communication module;
   a long range wireless communication module;
   a controller communicatively coupled to connected to the short range wireless communication module and a long range wireless communication module, the controller configured to
   in response to receiving via the long range wireless communication module a first message from a server over a long range communication protocol switching the controller into a distress mode, wherein the tracking device does not include a location module;
   based on switching into the distress mode the short range wireless communication module emits each of short range distress messages via the short range wireless communication module and long range distress messages with location data inferred from the long range distress messages over a low power wide-area network via the long range wireless communication module to a server; and
   periodically transmit short range distress messages via the short range wireless communication module for reception by other mobile communications devices within range and located outside the vehicle;
   whereby, a reception of the short range distress message via the short range wireless communication by other mobile devices within range and located outside the vehicle use a mobile device location module to infer a location of the tracking device solely due to close proximity required to receive the short range distress messages, and transmitting a location message from the other mobile devices to the server including the location of the tracking device.

2. The tracking device according to claim 1, wherein the short range wireless communication module is a Bluetooth communication module.

3. The tracking device according to claim 1, wherein the long range wireless communication module is a LoRa (Low Energy Long Range) wireless communication module for communication over a LoRa wireless network or a cellular network.

4. The tracking device according to claim 1, wherein the tracking device further comprises a memory for storing a unique identifier of the tracking device.

5. The tracking device according to claim 1, further comprising an accelerometer communicatively coupled to the controller and wherein the accelerometer measures the acceleration of the tracking device and thereby of a vehicle and stores acceleration data in a memory, and wherein the controller controls the short range wireless communication module to transmit a sequence of time stamped acceleration data to a mobile communications device.

6. A tracking system comprising:
a server including
a server processor in communication with server computer memory, the server processor configured to access the server computer memory to execute instructions for performing:
transmitting, from a server to a tracking device, a switching message over a long range communication protocol to switch the tracking device into a distress mode;
receiving, at the server from the tracking device, long range distress messages transmitted using a long range communication protocol with location data inferred from a low power wide-area network;
using, at the server, the location data to determine a geographical area in which a tracking device is located; and
transmitting, from the server to a mobile device, a listening message in the geographic area of the tracking device to enable the mobile device to receive short range distress messages from the tracking device;
the mobile device, including
a mobile device processor in communication with mobile device computer memory, the mobile device processor configured to access the mobile device computer memory to execute instructions for performing:
receiving, by the mobile device from the server, the listening message to enable the mobile device to receive short range distress messages from the tracking device
based on the message from the server to the mobile device, receiving at the mobile device the short range distress messages from the tracking device and obtaining a location from a mobile device location module to infer a location of the tracking device solely due to close proximity required to receive the short range distress messages; and
transmitting, to the server from the mobile devices, a location message including the location of the located tracking device;
the tracking device mechanically coupled to a vehicle, the tracking device including:
a short range wireless communication module;
a long range wireless communication module;
a controller communicatively coupled to connected to the short range wireless communication module and the long range wireless communication module, the controller configured to
in response to receiving, by the tracking device from the server, via a long range wireless communication module the switching message over the long range communication protocol switching the controller into the distress mode, wherein the tracking device does not include a location module;
based on switching into the distress mode the short range wireless communication module emits each of short range distress messages via the short range wireless communication module and long range distress messages with location data inferred by the server from the low power wide-area network via the long range wireless communication module; and
periodically transmitting, from the tracking device, short range distress messages via the short range wireless communication module for reception by the mobile device within range and located outside the vehicle;
whereby, the reception of the short range distress message via the short range wireless communication by other mobile devices within range and located outside the vehicle use a mobile device location module to infer a location of the tracking device solely due to close proximity required to receive the short range distress messages, and transmitting a location message from the mobile device to the server including the location of the tracking device.

7. The tracking system according to claim 6, wherein the long range communication protocol is a low power long range communication protocol.

8. The tracking system according to claim 7, wherein the long range communication protocol is a low power wide-area networks (LPWAN).

9. The tracking system according to claim 7, wherein the short range distress messages are encrypted.

10. The tracking system according to claim 9, wherein on receipt of a short range distress message from the tracking device the one or more mobile devices produces an audio and/or visual indicator for a user of at least one of the mobile devices indicating if they are moving towards or away from the located tracking device.

11. The tracking system according to claim 7, wherein on receipt of a short range distress message from the tracking device the one or more mobile devices produces an audio and/or visual indicator for a user of at least one of the mobile devices indicating if they are moving towards or away from the located tracking device.

12. The tracking system according to claim 11, wherein the audio and/or visual indicator is a sound that gets more frequent or louder as the mobile device gets closer to the tracking device.

13. The tracking system according to claim 6, wherein the short range distress messages are encrypted.

14. The tracking system according to claim 13, wherein on receipt of a short range distress message from the tracking device the one or more mobile devices produces an audio and/or visual indicator for a user of at least one of the mobile devices indicating if they are moving towards or away from the located tracking device.

15. The tracking system according to claim 6, wherein the short range distress messages is a Bluetooth communication.

16. The tracking system according to claim 6, wherein the long range communication protocol is a LoRa (Low Energy Long Range) wireless communication module for communication over a LoRa wireless network or a cellular network.

17. The tracking system according to claim 6, wherein the tracking device further comprises a memory for storing a unique identifier of the tracking device.

18. The tracking system according to claim 17, wherein the tracking device further comprises an accelerometer that measures the acceleration of the tracking device and thereby of a vehicle in which the tracking device is installed, and the tracking device stores acceleration data in a memory.

19. The tracking system according to claim 6, wherein the tracking device further comprises an accelerometer that measures the acceleration of the tracking device and thereby of a vehicle in which the tracking device is installed, and the tracking device stores acceleration data in a memory.

20. The tracking system according to claim 19, wherein the tracking device also provides driving behaviour data.

\* \* \* \* \*